(12) United States Patent
Sitaram et al.

(10) Patent No.: US 9,277,509 B1
(45) Date of Patent: Mar. 1, 2016

(54) DYNAMIC POWER BOOSTING BASED ON CONTIGUOUS AND NON-CONTIGUOUS COVERAGE

(71) Applicant: Sprint Communications Company L.P., Overland Park, KS (US)

(72) Inventors: Krishna Sitaram, Chantilly, VA (US); Daniel Alberto Vivanco, Sterling, VA (US); Chunmei Liu, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 194 days.

(21) Appl. No.: 14/025,577

(22) Filed: Sep. 12, 2013

(51) Int. Cl.
*H04B 7/00* (2006.01)
*H04W 52/28* (2009.01)

(52) U.S. Cl.
CPC .................................. *H04W 52/283* (2013.01)

(58) Field of Classification Search
None
See application file for complete search history.

(56) References Cited

U.S. PATENT DOCUMENTS

| 8,416,756 | B2 | 4/2013 | Bhushan et al. | |
|---|---|---|---|---|
| 8,862,134 | B1* | 10/2014 | Zhou | H04W 52/367 455/422.1 |
| 2008/0057933 | A1* | 3/2008 | Brunner | H04W 16/06 455/422.1 |
| 2010/0323745 | A1 | 12/2010 | Chen et al. | |
| 2011/0003567 | A1 | 1/2011 | Lee et al. | |
| 2011/0306337 | A1* | 12/2011 | Wirola | H04W 16/18 455/423 |
| 2012/0071157 | A1* | 3/2012 | Markoulidakis | H04W 24/08 455/423 |
| 2013/0010749 | A1 | 1/2013 | Chang et al. | |
| 2013/0114434 | A1* | 5/2013 | Muruganathan | H04W 16/14 370/252 |

* cited by examiner

*Primary Examiner* — Edward Urban
*Assistant Examiner* — Mohammed Rachedine

(57) ABSTRACT

A method, system, and medium are provided for dynamically activating and deactivating power boosting operations in a mobile communications network. A determination of whether a power boosting operation is appropriate or not is made based on the network's coverage contiguity characteristics. Power boosting operations are activated when the network exhibits contiguous coverage and deactivated when the network's coverage is non-contiguous.

20 Claims, 6 Drawing Sheets

DYNAMIC POWER BOOSTING BASED ON CONTIGUOUS AND NON-CONTIGUOUS COVERAGE

SUMMARY

Embodiments of the invention are defined by the claims below. A high-level overview of various aspects of the invention is provided to introduce a summary of the systems, methods, and media that are further described in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, computer-readable media, methods, and systems, for managing power boosting in a wireless communication network using, for example, inter-frequency scanning stats collected from different cells in the network to determine coverage contiguity. In another aspect, the power boosting may be managed by identifying neighbor lists for the different cells in the network and determining coverage contiguity from these neighbor lists. Then, power boosting may be activated when a determination that there is coverage contiguity, is made.

Power boosting in accordance with different aspects of the present invention may affect only the downlink. According to an aspect of the present invention, a decision to power boost is made based on a determination that there is contiguous coverage in the network or, in the alternative, that there is contiguous coverage at least in network clusters.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
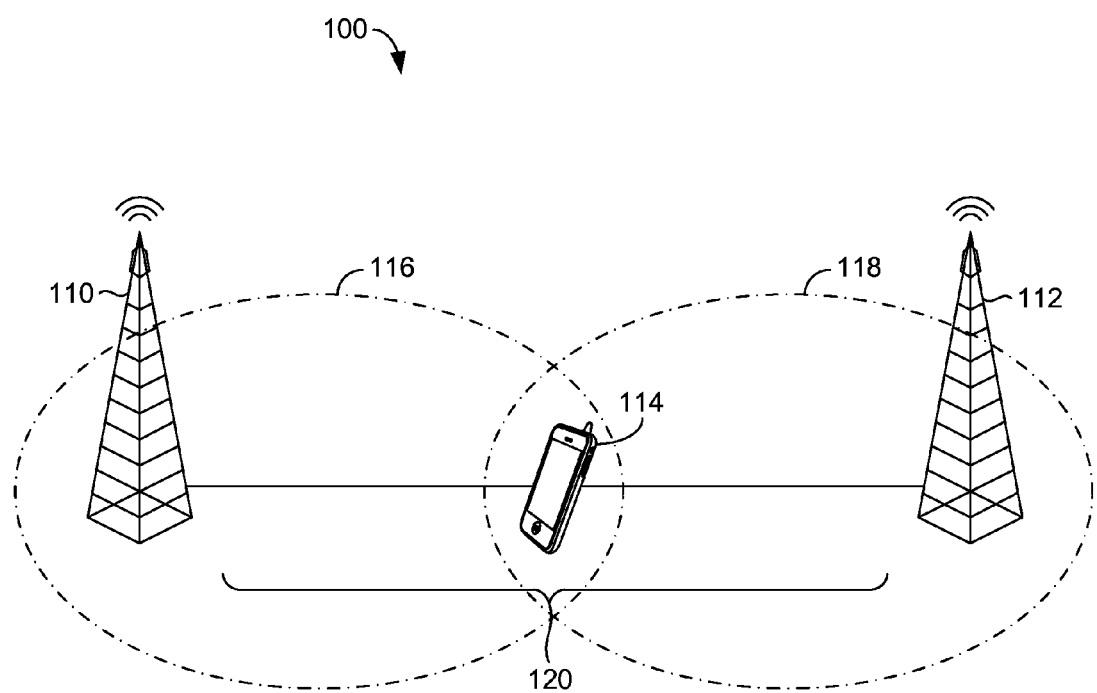
FIG. 1 is a network diagram of an exemplary telecommunications system according to embodiments of the invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In brief and at a high level, this disclosure describes, among other things, computer-readable media, methods, and systems, for managing power boosting in a wireless communication network using, for example, inter-frequency scanning stats collected from different cells in the network to determine coverage contiguity. In another example, the power boosting may be managed by identifying neighbor lists for the different cells in the network and determining coverage contiguity from these neighbor lists. Then, power boosting may be activated when a determination that there is coverage contiguity, is made.

Generally, user equipment (UE) may obtain and maintain connection with a network by communicating with a cell of that network. The cell that a UE connects to may depend on the physical location of the cell, the physical location of the UE, the strength of the connection between the cell and the UE, or a combination of these. For instance, while the UE is at physical location A, the UE may have a strong connection and be in communication with cell A. However, when the UE moves from physical location A to physical location B, the connection between the UE and cell A may become weakened due to the distance between cell A and the UE. The UE may need to obtain a connection with a different cell, such as a cell B, in order to maintain connection with the network. A connection with cell B may be established by transferring data associated with the UE from cell A to cell B. The process of transferring an ongoing call or data session from one cell to another cell is referred to as a handover. A determination of coverage contiguity may be made when a handover occurs smoothly from cell A to cell B, especially when the UE is engaged in a communication session with the network while moving from physical location A to physical location B.

The term uplink refers to a communication from a UE to a network cell. The term downlink refers to a communication from a network cell to a UE. Both the uplink and the downlink may have a separate group of radio frequencies (RF) dedicated to them respectively. These groups of frequencies can also be referred to as bands. A band gap may exist as a result of an imbalance between the uplink and the downlink. Further, the uplink throughput and the downlink throughput may be based on the capabilities of the network cells along with RF signal strength and quality.

As such, power boosting in accordance with different aspects of the present invention may control only the downlink range. According to an aspect of the present invention, a decision to power boost is made based on a determination that there is contiguous coverage in the network or, in the alternative, that there is contiguous coverage at least in network clusters.

In one embodiment, a determination of contiguous coverage may be made by collecting at predefined time intervals, inter-frequency scanning stats from a plurality of UE, where the inter-frequency scanning stats may be collected by at least one cell in the network. After gathering sufficient data from the cell, the mobile network's coverage characteristics may be modeled, and a coverage contiguity value may be determined or calculated. Then, the determined or calculated coverage contiguity value may be compared to the pre-set coverage contiguity threshold value. The coverage contiguity threshold value may be defined as a variable that represents contiguous coverage. Therefore, when the calculated coverage contiguity value is determined to be equal to or greater than the coverage contiguity threshold value, a determination that there is contiguous coverage in the network can be made and power boosting may be activated. Otherwise, when a determination is made that the coverage in the network is not contiguous, power boosting may not be activated.

A determination of contiguous coverage may also be made by calculating or determining a coverage contiguity value from neighbor lists for a particular cell. There are two general types of neighbor lists. A designed neighbor list (NLd), which assumes that the network is fully built with contiguous coverage and, an actual neighbor list (NLa), which is populated only by those cells that are active or "on air." A coverage contiguity value may be calculated by for example comparing the NLa to the NLd. Again, if the calculated coverage contiguity value is equal to or greater than the contiguity threshold value, a determination is made that the coverage in the network is contiguous and therefore, power boosting is activated.

This dynamic determination of power boosting only when the network is contiguous ensures that the UE does not encounter a negative performance impact from the network, since in order to have a stable connection between a UE and the network, both the uplink and the downlink need to be maintained. Additionally, network characteristics may change due to, for example, mechanical failure, weather, etc. As such, periodically performing a check for contiguous coverage in according to the present invention also allows for turning power boosting off if the network contiguous coverage conditions have deteriorated.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary, 25th Edition (2009).

An overview of a telecommunications system will be described, with reference to a network diagram of FIG. 1, which illustrates an exemplary wireless network system 100. Wireless network system 100 includes an exemplary arrangement of neighboring cells in a network for radio access for cellular systems, for example including, but not limited to, $2^{nd}$ (2G), $3^{rd}$ (3G), and $4^{th}$ (4G) generation. Access technologies such as 2G, 3G, 4G, 4G LTE, and future access networks may enable wide area coverage for network devices with various degrees of mobility. For example, the wireless network system 100 may enable a wireless network connection over one of the aforementioned access technologies using a protocol for wireless data transfer, including for example but not limiting such as Global System for Mobile communication (GSM), General Packet Radio Services (GPRS), Enhanced Data GSM Environment (EDGE), and Wideband Code Division Multiple Access (WCDMA), and/or Code Division Multiple Access (CDMA), Freedom of Mobile Multimedia Access (FOMA), and other 3G network protocols.

FIG. 1 includes a first cell 110, a neighboring cell 112, and a UE 114 located between the serving boundaries of the first cell 110 and the neighboring cell 112. Although only one UE and two cells are depicted in FIG. 1, it is contemplated that there may be numerous UEs and cells within the network. The UE 114 may subscribe to voice and data services offered by the network. As such, the UE 114 may be in communication with the network via either the first cell 110 through communications link 116 or the neighboring cell 112 through communications link 118. The communications links 116 and 118 each comprise radio frequency (RF) spectrum bandwidth. The UE 114 may communicate with the cells 110 or 112 via the links 116 or 118 respectively to facilitate attachment of the UE 114 to one of the cells 110 or 112. Once attached, the UE 114 may also use the links 116 or 118 to send and/or receive voice or data information.

Each of the cells 110 and 112 includes hardware and bandwidth(s) of a specified frequency. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more RF channels having a downlink channel and an associated Uplink channel. The RF channels are capable of carrying packet-switched technologies such as LTE, as well as other technologies such as circuit-switched technologies, although only one type of technology is carried by an RF channel at a time. The first cell 110 and the neighboring cell 112 may communicate with each other over an X2 interface 120. The X2 interface 120 is used to support UE mobility (e.g., handovers) as well as resource management functions. For the purposes of this application, cells that are located generally within the same geographic area and that are capable of serving the same UE are known as neighboring cells.

Embodiments of the invention may use one or more computer-readable media. Computer-readable media include both volatile and nonvolatile media, removable and nonremovable media, and media readable by a database and various other network devices. By way of example, and not limitation, computer-readable media may comprise computer storage media and communication media.

Computer storage media includes both volatile and nonvolatile, removable and nonremovable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Figure 2:
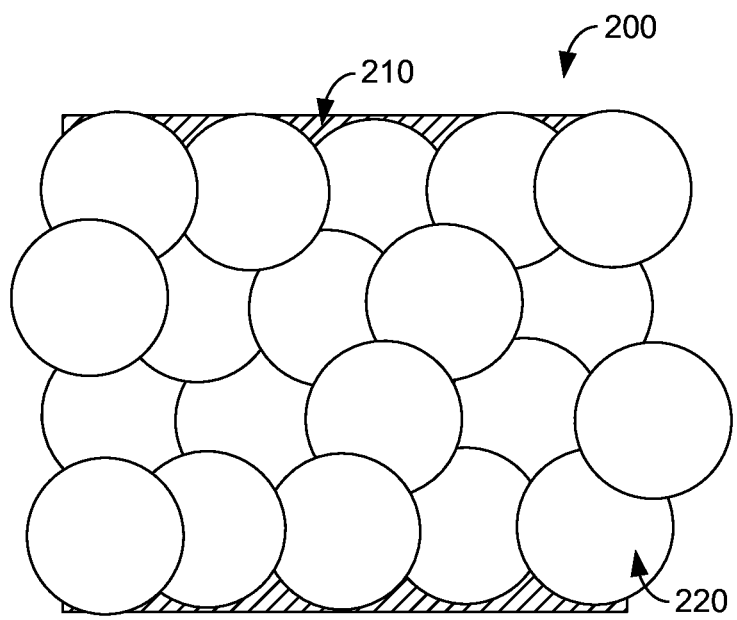
FIG. 2 is a schematic representation of a network coverage map with contiguous coverage in a multi-band network.

Turning now to FIG. 2, a schematic view of a network coverage map 200 with contiguous coverage in a multi-band network is shown. Typically in a multi-band network, coverage is provided by a plurality of cells operating at different frequencies, wherein one frequency has more penetration than the other. For example, in FIG. 2, network coverage by the lower frequency cell is shown as 210, which has more penetration than the higher frequency cell, shown as 220. As seen in FIG. 2, there is overlap between the network coverage offered by 210 and 220, as well as within 220. In other words, there are no network coverage gaps or holes for 210 and 220 and thus, it can be said that the network coverage is contiguous. And as such, the chances of having a UE dropped from the network are slim. This makes the particular geographic area corresponding to the network coverage map a good candidate for power boosting in accordance with the present invention.

Figure 3:
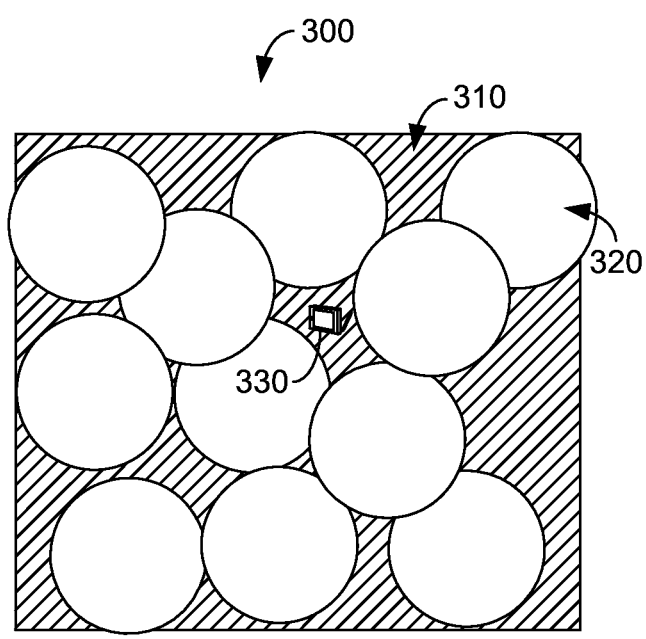
FIG. 3 is a schematic representation of a network coverage map with non-contiguous coverage in a multi-band network.

FIG. 3 is a schematic view of a network coverage map 300 with non-contiguous coverage in a multi-band network. In this case, network coverage by the lower frequency cell is shown as 310, which has more penetration than the higher frequency cell, shown as 320. As seen in FIG. 3, there is overlap between the network coverage offered by 310 and 320. However, the overlap within 320 is sporadic. In other words, there are many network coverage gaps or holes for 320 and thus, it can be said that the network coverage is non-contiguous. And as such, the chances of having a UE 330 dropped from the network are high particularly when the UE 330 is moving within the network coverage map and moves to a coverage hole in 320. This makes the particular geographic area corresponding to the network coverage map a poor candidate for power boosting in accordance with the present invention because the power resources allocated to the power boosting operation will be lost if the UE 330 is dropped from the network.

Figure 4:
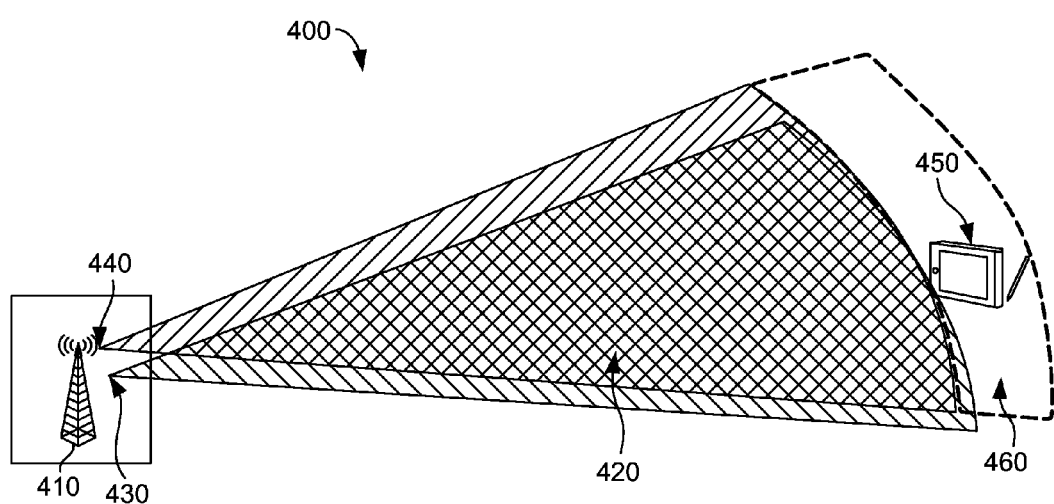
FIG. 4 is a schematic representation of a power boosting operation

Moving to FIG. 4, a schematic representation of a power boosting operation 400 is shown in reference to a single cell 410. As explained earlier, communication between a cell 410 and a UE 450 is 2-way. The UE 450 is capable of communicating (sending data) to the cell 410 in an uplink 430, and the cell 410 communicates (sends data) to the UE 450 in a downlink 440. When power boosting is not active, the downlink 440 footprint and the uplink 430 footprint match and when the UE 450 is located inside the footprint overlap region 420, the UE 450 will experience no problems in the network coverage. However, when a power boost is activated in the downlink 440, the footprint of the downlink is increased 460 while the footprint for the uplink 430 remains unchanged, thus creating a mismatch in the uplink 430 footprint and the downlink 440 footprint plus the power boost 460 footprint.

In the case where a contiguous network coverage is present, the footprints of a plurality of cells 410 will overlap with each other. Thus, for example, a UE 450 may be located at the edge of coverage footprint for cell A, the UE may have some uplink and downlink connectivity with cell A however, the connectivity would not be stable with cell A. However, the UE 450 may be located within the uplink and downlink footprint of cell B. When a power boost is activated for cell A, the UE 450 will be within the footprint of cell B and the power boost footprint of cell A, thus increasing the throughput in the downlink for UE 450. Thus, when contiguous coverage in the network is present in a certain geographic location, even if the UE 450 is moving within the geographic location, it will be handed over to the neighboring overlapping cell as a result of better channel estimation and thus, it will not be dropped from the network and with the power boost, it will experience a successful handover and as a result, an increased throughput in the downlink.

On the other hand, in the case where the coverage is non-contiguous, and the UE 450 is located at the edge of the downlink and uplink footprint for cell A, for example, a power boost in the downlink may increase the footprint in the downlink. However, the uplink footprint will remain the same and there will be a mismatch. As a result of the mismatch, the network cell will be able to communicate with the UE 450, but the UE 450 will not be able to communicate with the network cell. As a result, the session/call will be dropped.

Therefore, embodiments of the invention include, among other things, a method, system, or set of instructions embodied on one or more computer-readable storage media to dynamically activate power boosting when the network coverage is determined to be contiguous and, on the other hand, dynamically deactivate power boosting when the network coverage is determined to be non-contiguous. Networks conditions may change to become non-contiguous and no longer optimal for power boosting.

Figure 5:
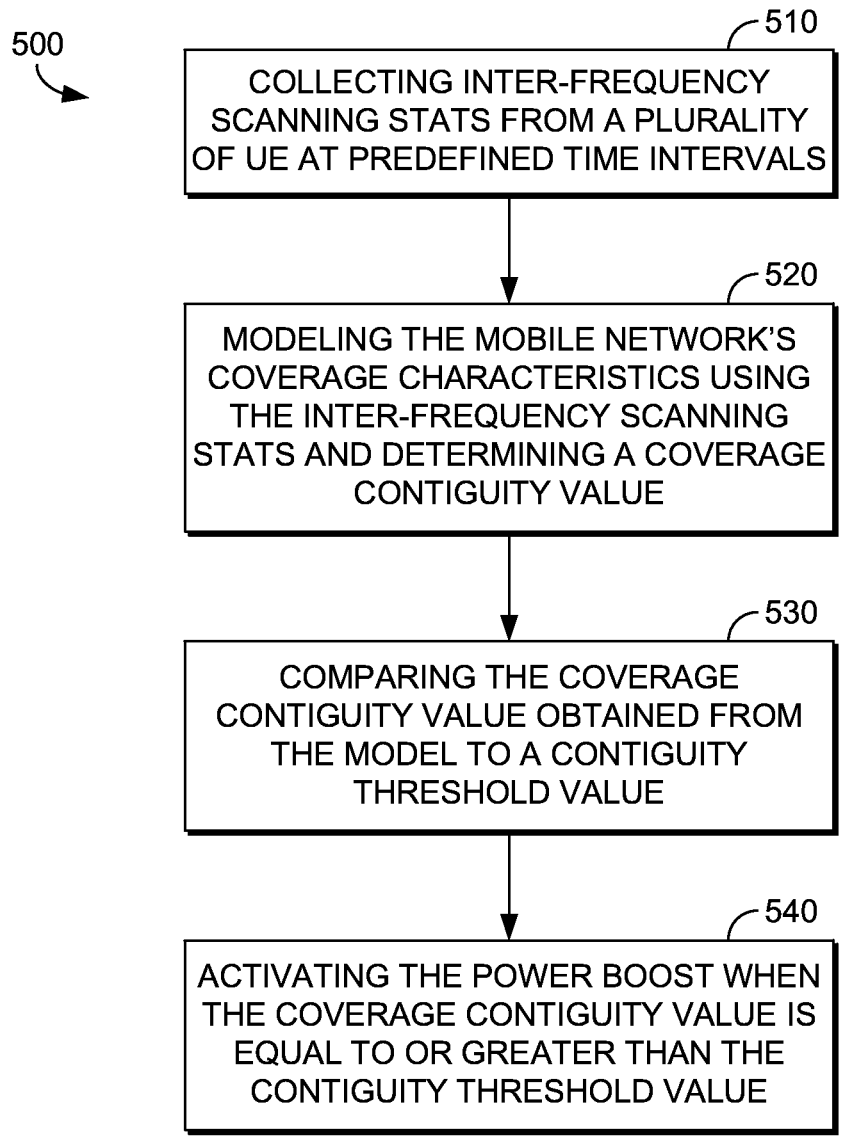
FIG. 5 depicts a flow diagram of a method for dynamically activating a power boost in accordance with the present invention.

Turning now to FIG. 5, a flow diagram for a method 500 for dynamically activating a power boost is depicted. The method involves collecting inter-frequency scanning stats from a plurality of UE at predefined time intervals, at step 510. The inter-frequency scanning stats may be reported by a plurality of mobile devices supported by the network, and may be collected at a core network component. An example of the inter-frequency scanning stats that can be used in accordance with the present invention is reference signal received power (RSRP) stats. At step 520, the inter-frequency stats are used for modeling the mobile network's coverage characteristics to determine a coverage contiguity value. The model can be created based on aggregated inter-frequency scanning stats from a predetermined amount of time, such as a predetermined number of previous minutes, hours, days, weeks, months, etc. A threshold coverage contiguity value may be estimated from the model by an operator. Additionally, the operator may define various levels of coverage based on the coverage contiguity threshold value and the aggregated inter-frequency scanning stats, and/or a link budget or network cell coverage, which threshold may be configurable by the operator. After the various levels of coverage are defined, a full coverage contiguity value can be established to indicate, for example 100% contiguity. The threshold coverage contiguity value may then be configured by the operator so that, when a calculated coverage contiguity value is greater than the threshold coverage contiguity value, the power boost may be activated and, when the calculated coverage contiguity value is less than the threshold coverage contiguity value, the power boost may not be activated. Or in the alternative, if the power boost has been previously activated, the power boost may be deactivated. The threshold coverage contiguity value may be set by the operator to be, for example, 75% contiguity, 80% contiguity, 60% contiguity, etc. or any other value deemed suitable for the particular network capabilities. At step 530, the coverage contiguity value determined from the model is compared to the threshold contiguity value. If the contiguity value determined from the model is found to be equal to or greater than the threshold contiguity value, the power boost is activated at step 540.

Figure 6:
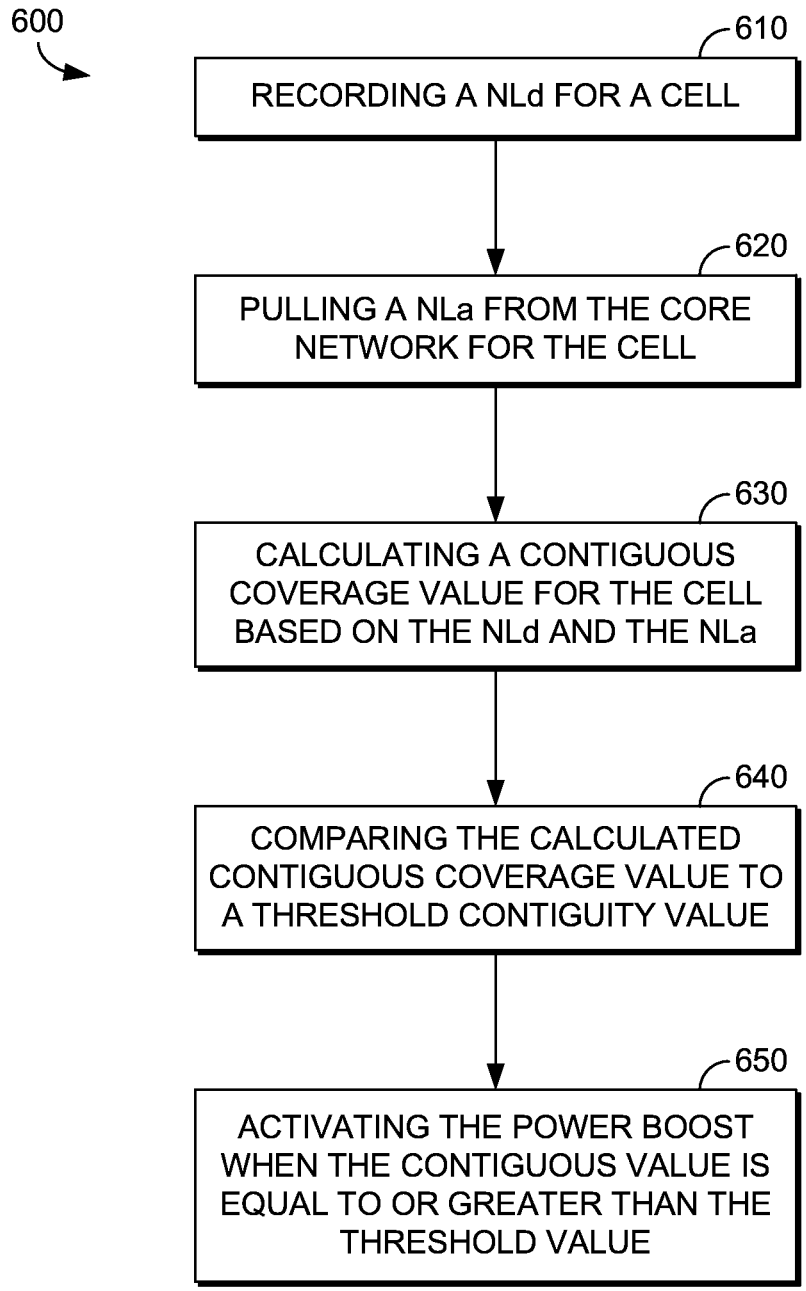
FIG. 6 depicts a flow diagram of another method for dynamically determining optimal conditions for a power boost.

FIG. 6 illustrates a flow diagram for another method 600 for dynamically determining whether conditions for a power boost are optimal and activating the power boost if the conditions are found to be optimal. At step 610, at a core network, recording a designed neighbor list (NLd) for every cell in the network, wherein the NLd assumes that the network is fully built with contiguous coverage and thus, is populated by all active and inactive cells in the network. At step 620, an actual neighbor list (NLa) is pulled for the cell of interest, wherein the NLa is populated only by neighboring cells that are active or "on air." At step 630, a contiguity coverage value is calculated for the cell of interest based on the NLd and NLa using the formula:

$$\text{contiguity coverage value} = (\text{\# of neighbors NL}a / \text{\# of neighbors NL}d) \times 100\%$$

At step 640, the calculated contiguity coverage value is compared to a threshold contiguity coverage value defined by the operator. Finally, at step 650, if the calculated contiguity coverage value is found to be equal to or greater than the threshold contiguity value, the power boost is activated.

Both of the methods shown in FIG. 5 and FIG. 6 can be used for determining coverage contiguity in a particular geographic location as a whole, or in the alternative, the methods described in FIGS. 5 and 6 may be used to identify contiguous coverage clusters within the geographic location such that power boost may be activated for the clusters of contiguous coverage.

Figure 7:
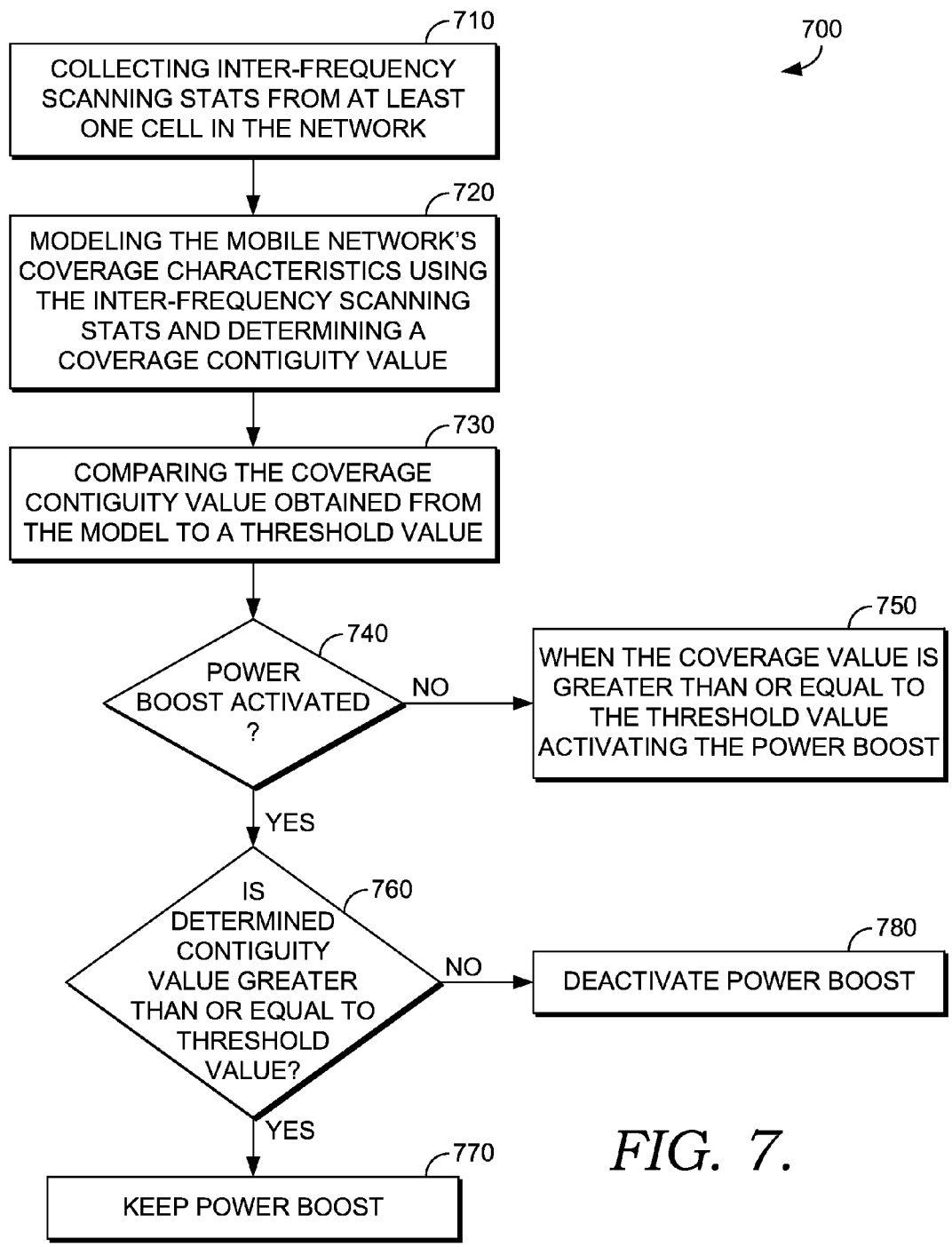
FIG. 7 depicts a flow diagram of a method for periodically implementing the method shown in FIG. 5.

FIG. 7 depicts a flow chart in which the method 500 shown in FIG. 5 could be used periodically to monitor power boosting operations. Although FIG. 7 shows the method 500 of FIG. 5, the method 600 of FIG. 6 could also be implemented for periodically monitoring of power boosting operations.

Turning now to FIG. 7, the method 700 comprises, at step 710, collecting inter-frequency scanning stats from at least one cell in the network. Step 710 may be performed by a core network component. At step 720, modeling the mobile network's coverage characteristics using the inter-frequency scanning stats and determining a coverage contiguity value. At step 730, comparing the coverage contiguity value obtained from the model to a threshold contiguity value. At step 740, determining whether the power boost was previously activated. If the power boost was not previously activated, activating the power boost at step 750 if the determined coverage contiguity value is equal to or greater than the threshold contiguity value. On the other hand, if the power boost was previously activated, determining if the coverage contiguity value is equal to or greater than the threshold value at step 760. If the determined coverage contiguity value is determined to be greater than or equal to the threshold value, keeping the power boost active at step 770. And, if the determined coverage contiguity value is determined to be less than the threshold value, deactivating the power boost. The method outlined in FIG. 7 can be repeated at predetermined time intervals or whenever deemed necessary for the optimal use of resources in a power boosting operation.

Many different arrangements of the various components depicted, as well as components not shown, are possible without departing from the scope of the claims below. Embodiments of our technology have been described with the intent to be illustrative rather than restrictive. Alternative embodiments will become apparent to the readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer-storage media devices having computer-executable instructions embodied thereon that, when executed by a computing device, cause the computing device to perform a method for activating a power boost for a cell based on a mobile network's coverage characteristics, the method comprising, at a core network:
   collecting, at a predefined time interval, inter-frequency scanning stats from a plurality of user equipment (UE);
   modeling the mobile network's coverage characteristics using the inter-frequency scanning stats and determining a coverage contiguity value from the inter-frequency scanning stats;
   comparing the coverage contiguity value obtained from the model to a contiguity threshold value, which is a minimum coverage contiguity value for indicating contiguous coverage for the mobile network, wherein the network's coverage is determined to be contiguous when footprints of a plurality of cells overlap with each other; and
   activating the power boost when the coverage contiguity value is equal to or greater than the contiguity threshold value.

2. The media of claim 1, wherein the contiguity threshold value is determined based on a link budget.

3. The media of claim 1, wherein modeling the mobile network's coverage characteristics using inter-frequency scanning stats comprises aggregated reference signal received power (RSRP) stats.

4. The media of claim 1, wherein the predefined time interval is measured in days.

5. The media of claim 1, wherein the predefined time interval is measured in hours.

6. The media of claim 1, wherein the mobile network is a long-term-evolution (LTE) network.

7. A computerized method for activating and deactivating a power boost based on a mobile network's coverage characteristics, the method comprising, at a core network:
   collecting at predefined time intervals, inter-frequency scanning stats from a plurality of user equipment (UE), the inter-frequency scanning stats being collected from at least one cell in the network;
   modeling the mobile network's coverage characteristics using the inter-frequency scanning stats and determining a coverage contiguity value for indicating contiguous coverage for the mobile network, wherein the network's coverage is determined to be contiguous when footprints of a plurality of cells overlap with each other;
   comparing the contiguity coverage value obtained from the model to a threshold value, wherein;
      (1) when the contiguity coverage value is equal to or greater than the threshold value at a first determination, activating the power boost; and
      (2) when the power boost has already been activated and at a second determination, the contiguity coverage value is less than the threshold value, deactivating the power boost.

8. The method of claim 7, wherein the contiguity threshold value is determined based on a link budget.

9. The method of claim 7, wherein modeling the mobile network's coverage characteristics using inter-frequency scanning stats comprises aggregated reference signal received power (RSRP) stats.

10. The method of claim 7, wherein the predefined time interval is measured in days.

11. The method of claim 7, wherein the predefined time interval is measured in hours.

12. The method of claim 7, wherein the mobile network is a long-term-evolution (LTE) network.

13. A computerized system for managing power boosting in a wireless communication network, the system comprising:
   a network component that:
      (1) collects inter-frequency scanning stats from at least one cell in the network at predefined time intervals;
      (2) models the wireless communication network's coverage characteristics using the collected inter-frequency scanning stats;
      (3) determines a coverage contiguity value from the modeled wireless network's coverage characteristics, wherein the coverage contiguity value is an indicator of contiguous coverage for the mobile network, wherein the network's coverage is determined to be contiguous when footprints of a plurality of cells overlap with each other;
      (4) compares the contiguity coverage value determined from the model to a threshold contiguity value; and (5) activates the power boosting when the coverage contiguity value is equal to or greater than the threshold contiguity value.

14. The system of claim 13, wherein the threshold contiguity value is determined based on a link budget.

15. The system of claim 13, wherein the inter-frequency scanning stats used for modeling the wireless communication network's coverage characteristics comprise aggregated reference signal received power (RSRP) stats.

16. The system of claim 13, wherein the predefined time intervals are measured in days.

17. The system of claim 13, wherein the predefined time intervals are measured in hours.

18. The system of claim 13, wherein the wireless communication network is a long-term-evolution (LTE) network.

19. The system of claim 13, wherein the network component further deactivates the power boosting when the coverage contiguity value is determined to be less than the threshold contiguity value.

20. The system of claim 13, wherein the wireless communication network is a $4^{th}$ Generation (4G) network.

* * * * *